(12) United States Patent
Amerga et al.

(10) Patent No.: US 9,137,718 B2
(45) Date of Patent: Sep. 15, 2015

(54) CELL RESELECTION BASED ON MULTIMEDIA BROADCAST MULTICAST SERVICE (MBMS) METRICS

(71) Applicant: QUALCOMM Incorporated, San Diego, CA (US)

(72) Inventors: Daniel Amerga, San Diego, CA (US); Kuo-Chun Lee, San Diego, CA (US); Shailesh Maheshwari, San Diego, CA (US); Thadi Manjunath Nagaraj, San Diego, CA (US); Rajesh Narayanan, San Diego, CA (US); Jack S. Shauh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 13/738,308

(22) Filed: Jan. 10, 2013

(65) Prior Publication Data
US 2013/0183973 A1 Jul. 18, 2013

Related U.S. Application Data

(60) Provisional application No. 61/586,004, filed on Jan. 12, 2012.

(51) Int. Cl.
*H04W 36/00* (2009.01)
*H04W 48/20* (2009.01)
(Continued)

(52) U.S. Cl.
CPC .......... *H04W 36/0083* (2013.01); *H04W 48/20* (2013.01); *H04W 48/16* (2013.01); *H04W 72/005* (2013.01)

(58) Field of Classification Search
USPC ........... 455/436, 435.2, 432.1, 438, 439, 443, 455/428
See application file for complete search history.

(56) References Cited

U.S. PATENT DOCUMENTS 7,996,008 B2    8/2011    Wakabayashi
2005/0090278 A1    4/2005    Jeong et al.
(Continued)

FOREIGN PATENT DOCUMENTS

EP    1467586 A2    10/2004
EP    2104389 A1    9/2009
(Continued)

OTHER PUBLICATIONS

3GPP TS 36.300 V11.0.0., "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP Standard; 3GPP TS 36.300, 3rd Generation Partnership Project (3GPP), Mobile Competence Centre ; 650, Route Des Lucioles ; F-06921 Sophia-Antipolis Cedex ; France, vol. RAN WG2, No. V11.0.0, Dec. 20, 2011, pp. 1-194, XP050555023, [retrieved on Dec. 20, 2011].
(Continued)

*Primary Examiner* — David Q Nguyen
(74) *Attorney, Agent, or Firm* — Austin Rapp & Hardman

(57) ABSTRACT

A method for cell reselection by a wireless communication device is described. The method includes camping on a serving cell in idle mode. A neighbor cell is detected. A serving cell rank is computed for the serving cell. A neighbor cell rank is computed for the neighbor cell based on multimedia broadcast multicast service metrics. Cell reselection is determined based on the serving cell rank and the neighbor cell rank.

52 Claims, 12 Drawing Sheets

(51) Int. Cl.
 *H04W 72/00* (2009.01)
 *H04W 48/16* (2009.01)

(56) References Cited

U.S. PATENT DOCUMENTS

2008/0287129 A1 11/2008 Somasundaram et al.
2011/0305184 A1 12/2011 Hsu

FOREIGN PATENT DOCUMENTS

WO WO-2008112255 A2 9/2008
WO WO-2012138128 A2 10/2012

OTHER PUBLICATIONS

Bell, A-L.S., et al., "Enhancement of cell reselection for MBMS service continuity", 3GPP Draft; R2-112230, 3rd Generation Partnership Project (3GPP), Mobile Competence Centr; 650, Route Des Lucioles; F-06921 Sophia-Antipolis Cedex; France, vol. RAN WG2, no. Shanghai, China; Apr. 11, 2011, XP050494395, [retrieved on Apr. 4, 2011].
International Search Report and Written Opinion—PCT/US2013/021152—ISA/EPO—Apr. 19, 2013.
Taiwan Search Report—TW102101290—TIPO—Aug. 18, 2014.

CELL RESELECTION BASED ON MULTIMEDIA BROADCAST MULTICAST SERVICE (MBMS) METRICS

CROSS-REFERENCE TO RELATED APPLICATIONS

This application is related to and claims priority from U.S. Provisional Patent Application Ser. No. 61/586,004, filed Jan. 12, 2012, for "CELL RESELECTION BASED ON A MULTIMEDIA BROADCAST MULTICAST SERVICE METRIC."

TECHNICAL FIELD

The present disclosure relates generally to wireless communication systems. More specifically, the present disclosure relates to systems and methods for cell reselection based on Multimedia Broadcast Multicast Service (MBMS) metrics.

BACKGROUND

Wireless communication systems are widely deployed to provide various types of communication content such as voice, video, data and so on. These systems may be multiple-access systems capable of supporting simultaneous communication of multiple wireless communication devices with one or more base stations.

Sometimes a wireless communication device will switch from monitoring one cell (via a first base station) to monitoring another cell (via a second base station) when the wireless communication device has already registered with the first base station and is camped on the first base station. This may be referred to as cell reselection. The introduction of new technologies requires improvements to cell reselection procedures. Benefits may be realized by improvements to cell reselection procedures for Multimedia Broadcast Multicast Service (MBMS).

DETAILED DESCRIPTION

A wireless communication device may camp on a serving cell in idle mode. The wireless communication device may detect one or more neighbor cells. In order to determine which cell to camp on (the serving cell or the neighbor cell), the wireless communication device typically computes a rank for each cell and then compares the ranks, selecting the highest rank as the cell that the wireless communication device camps on. By computing advanced ranks for each cell that are based on multimedia broadcast multicast service (MBMS) metrics, the wireless communication device may be better able to rank the cells to account for services that the wireless communication device may desire.

In the following description, for reasons of conciseness and clarity, terminology associated with the Long Term Evolution (LTE) standards, as promulgated under the 3rd Generation Partnership Project (3GPP) by the International Telecommunication Union (ITU), is used. It should be noted that the invention is also applicable to other technologies, such as technologies and the associated standards related to Code Division Multiple Access (CDMA), Time Division Multiple Access (TDMA), Frequency Division Multiple Access (FDMA), Orthogonal Frequency Division Multiple Access (OFDMA) and so forth. Terminologies associated with different technologies can vary. For example, depending on the technology considered, a wireless device can sometimes be called a user equipment, a mobile station, a mobile terminal, a subscriber unit, an access terminal, etc., to name just a few. Likewise, a base station can sometimes be called an access point, a Node B, an evolved Node B, and so forth. It should be noted that different terminologies apply to different technologies when applicable.

Figure 1:
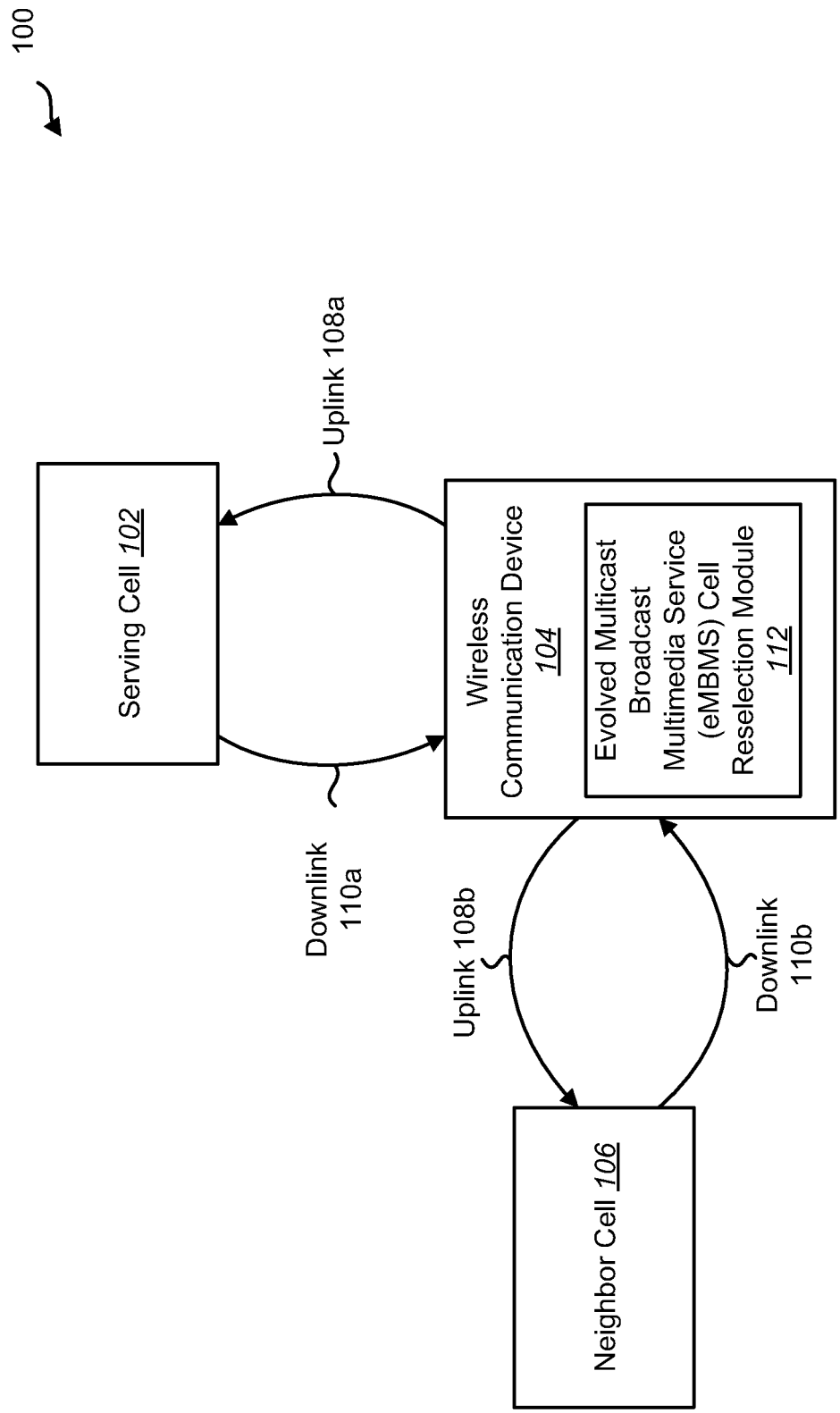
FIG. 1 shows a wireless communication system.

FIG. 1 shows a wireless communication system 100. Wireless communication systems 100 are widely deployed to provide various types of communication content such as voice, data and so on. A wireless communication system 100 may include multiple wireless devices. A wireless device may be a base station or a wireless communication device 104. A wireless communication device 104 may be configured to perform reselection procedures based on an evolved multimedia broadcast multicast service (eMBMS) metric, such as the number of Temporary Mobile Group Identities (TMGIs) or the number of Multimedia Broadcast over a Single Frequency Network (MBSFN) areas.

A base station is a station that communicates with one or more wireless communication devices 104. A base station may also be referred to as, and may include some or all of the functionality of, an access point, a broadcast transmitter, a NodeB, an evolved NodeB, etc. The term "base station" will be used herein. Each base station provides communication coverage for a particular geographic area. A base station may provide communication coverage for one or more wireless communication devices 104. The term "cell" can refer to a base station and/or its coverage area, depending on the context in which the term is used. The wireless communication system 100 may include a serving cell 102 and at least one neighbor cell 106. The serving cell 102 may include one or more base stations. Each neighbor cell 106 may also include one or more base stations.

Communications in a wireless system (e.g., a multiple-access system) may be achieved through transmissions over a wireless link. Such a communication link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

The wireless communication system 100 may utilize MIMO. A MIMO system may support both time division duplex (TDD) and frequency division duplex (FDD) systems. In a TDD system, uplink and downlink transmissions are in the same frequency region so that the reciprocity principle allows the estimation of the downlink channel from the uplink channel. This enables a transmitting wireless device to extract transmit beamforming gain from communications received by the transmitting wireless device.

The wireless communication system 100 may be a multiple-access system capable of supporting communication with multiple wireless communication devices 104 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA and GSM are part of Universal Mobile Telecommunication System (UMTS). Long Term Evolution (LTE) is a release of UMTS that uses E-UTRA. UTRA, E-UTRA, GSM, UMTS and Long Term Evolution (LTE) are described in documents from an organization named "3rd Generation Partnership Project" (3GPP). cdma2000 is described in documents from an organization named "3rd Generation Partnership Project 2" (3GPP2).

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices.

In 3GPP Long Term Evolution (LTE), a wireless communication device 104 may be referred to as a "user equipment" (UE). A wireless communication device 104 may also be referred to as, and may include some or all of the functionality of, a terminal, an access terminal, a subscriber unit, a station, etc. A wireless communication device 104 may be a cellular phone, a personal digital assistant (PDA), a wireless device, a wireless modem, a handheld device, a laptop computer, etc.

A wireless communication device 104 may communicate with zero, one or multiple base stations on the downlink 110a-b and/or uplink 108a-b at any given moment. The downlink 110 (or forward link) refers to the communication link from a cell (via a base station) to a wireless communication device 104, and the uplink 108 (or reverse link) refers to the communication link from a wireless communication device 104 to a cell (via a base station).

Long Term Evolution (LTE) Release 9 provides support for evolved Multicast Broadcast Multimedia Service (eMBMS) in the Long Term Evolution (LTE) air interface using the Multimedia Broadcast over a Single Frequency Network (MBSFN) infrastructure. The Multimedia Broadcast over a Single Frequency Network (MBSFN) infrastructure is discussed in additional detail below in relation to FIG. 2. The wireless communication device 104 may include an evolved Multicast Broadcast Multimedia Service (eMBMS) cell reselection module 112 that allows the wireless communication device 104 to perform cell reselection procedures in the Multimedia Broadcast over a Single Frequency Network (MBSFN) infrastructure. The evolved Multicast Broadcast Multimedia Service (eMBMS) cell reselection module 112 performs cell reselection procedures based on an evolved Multicast Broadcast Multimedia Service (eMBMS) metric. The evolved Multicast Broadcast Multimedia Service (eMBMS) cell reselection module 112 is discussed in additional detail below in relation to FIG. 4.

The wireless communication device 104 may need to perform cell reselection to reselect from the serving cell 102 to a neighbor cell 106 when the wireless communication device 104 is in idle mode of unicast service (i.e., RRC_IDLE). To support intra-frequency cell reselection, the wireless communication device 104 typically measures the signal of the serving cell 102 (denoted by Q_s) and the signal of the neighbor cell 106 (denoted by Q_n). The wireless communication device 104 may then compute a rank (R_s) for the serving cell 102 using Equation (1) and a rank (R_n) for the neighbor cell 106 using Equation (2):

$$R\_s = Q\_s + Q\_hys. \quad (1)$$

$$R\_n = Q\_n - Q\_\text{offset}. \quad (2)$$

In Equation (1), Q_hys is a hysteresis value added to the serving cell rank (R_s) to adjust how frequently cell reselection occurs. Likewise, in Equation (2), Q_offset is an offset value subtracted from the neighbor cell rank (R_n) to adjust how frequently cell reselection occurs. If the wireless communication device 104 discovers a neighbor cell 106 with a higher rank than the serving cell 102, the wireless communication device 104 may reselect to the neighbor cell 106 (as defined in 3GPP TS 36.304).

However, the cell reselection algorithm of Equation (1) and Equation (2) does not suffice when the wireless communication device 104 is receiving evolved Multicast Broadcast Multimedia Service (eMBMS) service. For example, the wireless communication device 104 may perform a cell reselection to the neighbor cell 106 with the highest rank, even though the neighbor cell 106 does not provide any of the evolved Multicast Broadcast Multimedia Service (eMBMS)

services currently used by the wireless communication device 104, leading to bad user experience. The evolved Multicast Broadcast Multimedia Service (eMBMS) cell reselection module 112 allows the wireless communication device 104 to account for evolved Multicast Broadcast Multimedia Service (eMBMS) services when determining whether to perform a cell reselection.

Figure 2:
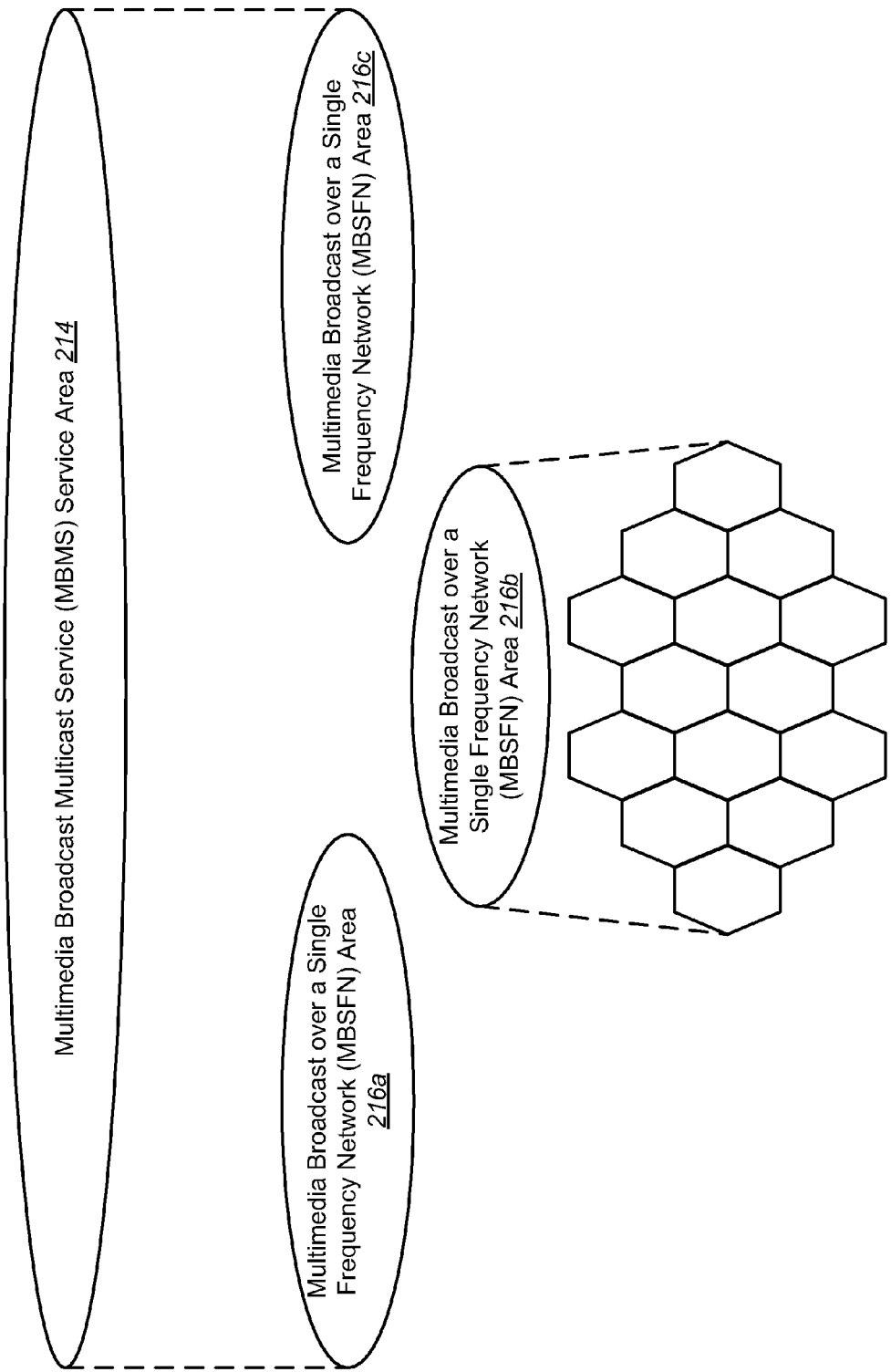
FIG. 2 illustrates a Multimedia Broadcast over a Single Frequency Network (MBSFN) infrastructure.

FIG. 2 illustrates a Multimedia Broadcast over a Single Frequency Network (MBSFN) infrastructure. The Multimedia Broadcast over a Single Frequency Network (MBSFN) infrastructure may include a Multimedia Broadcast Multicast Service (MBMS) service area 214, which is the area with evolved Multicast Broadcast Multimedia Service (eMBMS) service. The Multimedia Broadcast Multicast Service (MBMS) service area 214 may be divided into one or more Multimedia Broadcast over a Single Frequency Network (MBSFN) areas 216*a-c*. Each Multimedia Broadcast over a Single Frequency Network (MBSFN) area 216 may include multiple base stations (e.g., eNBs) that can synchronously transmit the same evolved Multicast Broadcast Multimedia Service (eMBMS) contents. Each Multimedia Broadcast over a Single Frequency Network (MBSFN) area 216 can be used to broadcast the venue, regional contents and national contents. One Long Term Evolution (LTE) cell can support a maximum of eight Multimedia Broadcast over a Single Frequency Network (MBSFN) areas 216. For in-venue broadcast, the size of a Multimedia Broadcast over a Single Frequency Network (MBSFN) area 216 may be as small as one cell or as large as hundreds of cells.

The base stations of each Multimedia Broadcast over a Single Frequency Network (MBSFN) area 216 may transmit Multicast Traffic Channels (MTCHs) and Multicast Control Channels (MCCHs) at the same time. Therefore, the wireless communication device 104 can combine signals broadcast from different base stations (similar to a soft handoff).

Figure 3:
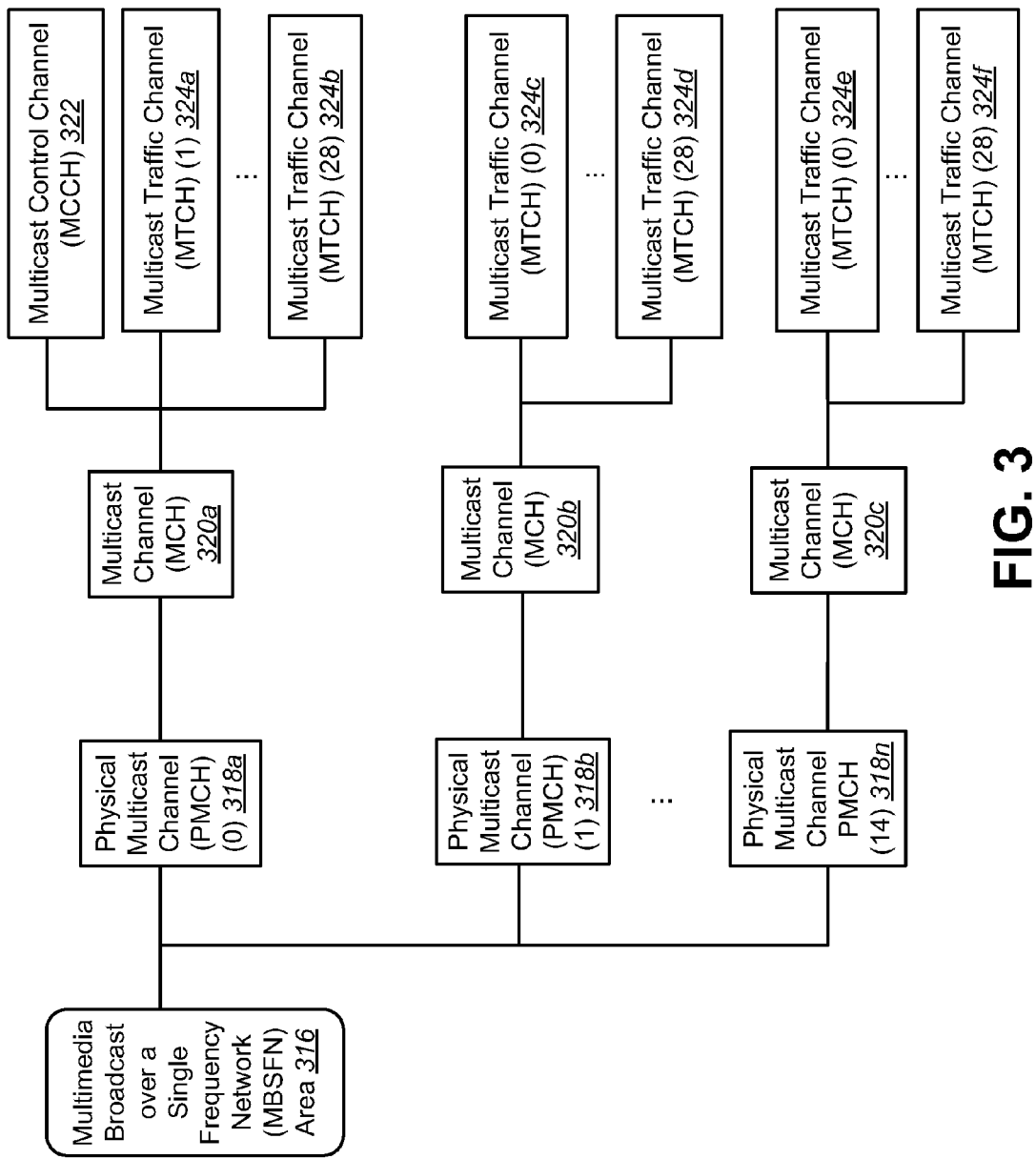
FIG. 3 illustrates the channel structure for a Multimedia Broadcast over a Single Frequency Network (MBSFN) area.

FIG. 3 illustrates the channel structure for a Multimedia Broadcast over a Single Frequency Network (MBSFN) area 316. A Multimedia Broadcast over a Single Frequency Network (MBSFN) area 316 may include up to 15 Physical Multicast Channels (PMCHs) 318*a-n*. Each Physical Multicast Channel (PMCH) 318 corresponds to a Multicast Channel (MCH) 320*a-c* transport channel. Each Multicast Channel (MCH) 320 can multiplex up to 29 Multicast Traffic Channel (MTCH) 324*a-f* logical channels. Each Multimedia Broadcast over a Single Frequency Network (MBSFN) area 316 includes one Multicast Control Channel (MCCH) 322 logical channel, which is multiplexed with the Multicast Traffic Channels (MTCHs) 324 into a Multicast Channel (MCH) 320 associated with a Physical Multicast Channel (PMCH) 318. For example, the Multicast Control Channel (MCCH) 322 may be multiplexed in place of Multicast Traffic Channel (MTCH) (1) in the Multicast Channel (MCH) 320*a* in Physical Multicast Channel (PMCH) (0) 318*a* for a single Multimedia Broadcast over a Single Frequency Network (MBSFN) area 316.

To acquire a Multicast Traffic Channel (MTCH) 324, the wireless communication device 104 needs to receive a Session Description of User Service Description of the evolved Multicast Broadcast Multimedia Service (eMBMS) in which the Temporary Mobile Group Identity (TMGI) and the optional Session ID of the interested evolved Multicast Broadcast Multimedia Service (eMBMS) service is specified, as well as the start time of the evolved Multicast Broadcast Multimedia Service (eMBMS) service. The wireless communication device 104 may camp on a Long Term Evolution (LTE) cell to discover the availability of evolved Multicast Broadcast Multimedia Service (eMBMS) services and a corresponding access stratum configuration.

The wireless communication device 104 may first acquire a SIB13 (SystemInformationBlockType13). The SIB13 may indicate the Multimedia Broadcast over a Single Frequency Network (MBSFN) area ID of each Multimedia Broadcast over a Single Frequency Network (MBSFN) area 316 supported by the cell. The SIB13 may also indicate information that may be used to acquire the Multicast Control Channel (MCCH) 322 of the Multimedia Broadcast over a Single Frequency Network (MBSFN) area 316. This information may include the Multicast Control Channel (MCCH) repetition period (32, 64, . . . , 256 frames), the Multicast Control Channel (MCCH) offset (0, 1, . . . , 10 frames), the Multicast Control Channel (MCCH) modification period (512 or 1024 frames), the signaling modulation and coding scheme (MCS), and sf-AllocInfo, which indicates which subframes of the radio frame, as indicated by the repetition period and the offset, can transmit the Multicast Control Channel (MCCH) 322.

The SIB13 may also indicate a notification configuration. The notification configuration may include a notification indicator, a notification repetition coefficient, a notification offset, and a notification subframe. The notification indicator may be the bit index in the physical downlink control channel (PDCCH) downlink control information (DCI) Format 1C that indicates a Multicast Control Channel (MCCH) 322 information change for each Multimedia Broadcast over a Single Frequency Network (MBSFN) area 316 when a new session is added. The notification period is the minimum modification period of all Multimedia Broadcast over a Single Frequency Network (MBSFN) areas 316 divided by the notification repetition coefficient (e.g., 2 or 4). The notification offset may indicate the offset in frames of the notification (e.g., 0-10 frames). The notification subframe is the subframe in the radio frame that is used to send the notification.

The wireless communication device 104 may then acquire an MBSFNAreaConfiguration message on the Multicast Control Channel (MCCH) 322. The MBSFNAreaConfiguration message may indicate the temporary mobile group identity (TMGI) and optional session ID of each Multicast Traffic Channel (MTCH) 324, which is identified by the logical channel ID (LCID) within the Physical Multicast Channel (PMCH) 318. The MBSFNAreaConfiguration message may also indicate the allocated resources (e.g., radio frames and subframes) for transmitting each Physical Multicast Channel (PMCH) 318 of the Multimedia Broadcast over a Single Frequency Network (MBSFN) area 316 and the allocation period (e.g., 4, 8, . . . , 256 frames) of the allocated resources for all the Physical Multicast Channels (PMCHs) 318 in the Multimedia Broadcast over a Single Frequency Network (MBSFN) area 316. The MBSFNAreaConfiguration may further include the Multicast Channel (MCH) scheduling period (MSP) over which the Multicast Channel (MCH) scheduling information (MSI) media access control (MAC) control element is transmitted. The Multicast Channel (MCH) scheduling period (MSP) may be 8, 16, 32, . . . , or 1024 radio frames. In other words, the Multicast Channel (MCH) scheduling information (MSI) MAC control element is sent once per Multicast Channel (MCH) scheduling period (MSP).

Figure 4:
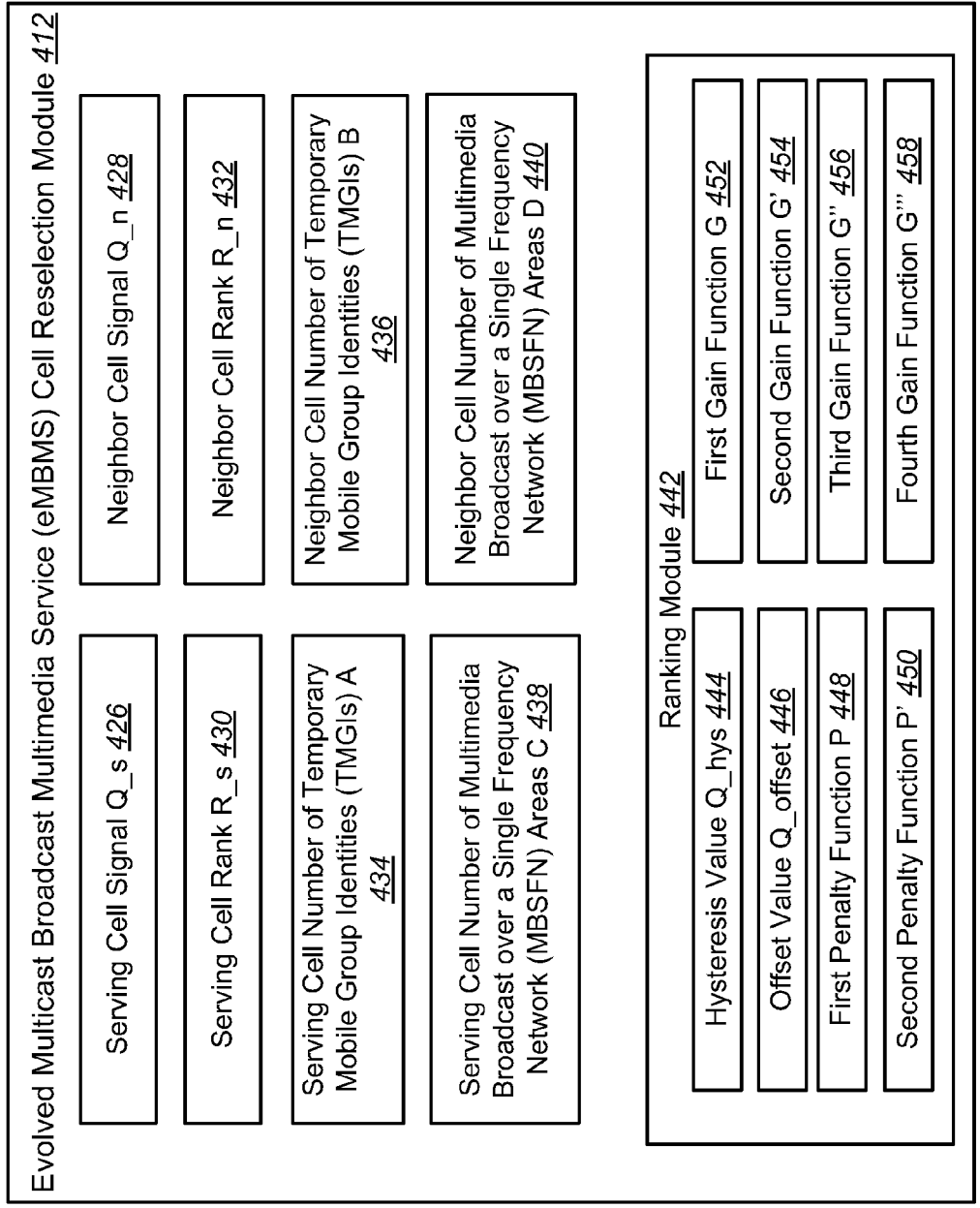
FIG. 4 is a block diagram illustrating an evolved Multicast Broadcast Multimedia Service (eMBMS) cell reselection module.

FIG. 4 is a block diagram illustrating an evolved Multicast Broadcast Multimedia Service (eMBMS) cell reselection module 412. The evolved Multicast Broadcast Multimedia Service (eMBMS) cell reselection module 412 of FIG. 4 may be one configuration of the evolved Multicast Broadcast Multimedia Service (eMBMS) cell reselection module 112 of FIG. 1. A wireless communication device 104 may use the evolved Multicast Broadcast Multimedia Service (eMBMS) cell reselection module 412 each time a neighbor cell 106 is discovered (when the wireless communication device 104 is using evolved Multicast Broadcast Multimedia Service (eMBMS) services).

The evolved Multicast Broadcast Multimedia Service (eMBMS) cell reselection module 412 may include a serving cell signal Q_s 426. As discussed above, the serving cell signal Q_s 426 is a measurement of the signal received from the serving cell 102. The evolved Multicast Broadcast Multimedia Service (eMBMS) cell reselection module 412 may also include a neighbor cell signal Q_n 428. As discussed above, the neighbor cell signal Q_n 428 is a measurement of the signal received from a neighbor cell 106. Thus, the evolved Multicast Broadcast Multimedia Service (eMBMS) cell reselection module 412 may include multiple neighbor cell signals Q_n 428 corresponding to the multiple neighbor cells 106.

The evolved Multicast Broadcast Multimedia Service (eMBMS) cell reselection module 412 may include a ranking module 442. The ranking module 442 may compute a serving cell rank R_s 430 and a neighbor cell rank R_n 432, each of which takes into account evolved Multicast Broadcast Multimedia Service (eMBMS) services. The evolved Multicast Broadcast Multimedia Service (eMBMS) cell reselection module 412 may then compare the serving cell rank R_s 430 and the neighbor cell rank R_n 432 to determine whether to perform a cell reselection procedure.

The ranking module 442 may include a hysteresis value Q_hys 444 and an offset value Q_offset 446. The hysteresis value Q_hys 444 and the offset value Q_offset 446 may be used by the evolved Multicast Broadcast Multimedia Service (eMBMS) cell reselection module 412 to avoid rapid cell reselection procedures between a serving cell 102 and a neighbor cell 106 and/or to control the rate of cell reselection.

In addition to measuring the signal quality of the neighbor cells 106, the wireless communication device 104 may check the number of lost evolved Multicast Broadcast Multimedia Service (eMBMS) channels (that are currently being used) if the wireless communication device 104 reselects to the neighbor cell 106. The more evolved Multicast Broadcast Multimedia Service (eMBMS) channels lost (by reselecting to a neighbor cell 106), the lower the priority for the cell reselection. The number of lost evolved Multicast Broadcast Multimedia Service (eMBMS) channels may be the difference between the serving cell number of Temporary Mobile Group Identities (TMGIs) A 434 and the neighbor cell number of Temporary Mobile Group Identities (TMGIs) B 436 (assuming a reselection from the serving cell 102 to the neighbor cell 106). For example, the wireless communication device 104 may be interested in the Temporary Mobile Group Identities (TMGIs) X, Y, and Z. The Temporary Mobile Group Identities (TMGIs) X, Y, and Z may be activated by the serving cell 102 and the Temporary Mobile Group Identities (TMGIs) X and Y may be activated by a neighbor cell 106. Thus, the serving cell number of Temporary Mobile Group Identities (TMGIs) A 434=3 and the neighbor cell number of Temporary Mobile Group Identities (TMGIs) B 436=2.

The wireless communication device 104 may also determine the serving cell number of Multimedia Broadcast over a Single Frequency Network (MBSFN) areas C 438 and the neighbor cell number of Multimedia Broadcast over a Single Frequency Network (MBSFN) areas D 440. For example, the wireless communication device 104 may be interested in the Multimedia Broadcast over a Single Frequency Network (MBSFN) areas M, N, and L. The serving cell 102 may activate the Multimedia Broadcast over a Single Frequency Network (MBSFN) areas M, N, and L. The neighbor cell 106 may activate the Multimedia Broadcast over a Single Frequency Network (MBSFN) areas M and N. Thus, the serving cell number of Multimedia Broadcast over a Single Frequency Network (MBSFN) areas C 438=3 and the neighbor cell number of Multimedia Broadcast over a Single Frequency Network (MBSFN) areas D 440=2.

The serving cell number of Temporary Mobile Group Identities (TMGIs) A 434, the neighbor cell number of Temporary Mobile Group Identities (TMGIs) B 436, the serving cell number of Multimedia Broadcast over a Single Frequency Network (MBSFN) areas C 438 and the neighbor cell number of Multimedia Broadcast over a Single Frequency Network (MBSFN) areas D 440 may all be referred to as Multimedia Broadcast Multicast Service (MBMS) metrics.

The ranking module 442 may include a first penalty function P 448 that bases rank on the number of lost evolved Multicast Broadcast Multimedia Service (eMBMS) channels. The first penalty function P 448 may be a function of the number of lost Temporary Mobile Group Identities (TMGIs) if the neighbor cell 106 is to be reselected (and may thus reduce the neighbor cell rank R_n 432). The first penalty function P 448 may be a non-decreasing function of the input, with P(0)=0. The first penalty function P 448 may depend on the serving cell number of Temporary Mobile Group Identities (TMGIs) A 434 and the neighbor cell number of Temporary Mobile Group Identities (TMGIs) B 436. For example, the neighbor cell rank R_n 432 may be computed using Equation (3) instead of Equation (2):

$$R\_n = Q\_n - Q\_\text{offset} - P(A-B). \qquad (3)$$

Instead of basing cell reselection on the number of lost evolved Multicast Broadcast Multimedia Service (eMBMS) channels (currently being used by the wireless communication device 104), cell reselection may be based on the lost Multimedia Broadcast over a Single Frequency Network (MBSFN) areas 216 (i.e., the number of Multimedia Broadcast over a Single Frequency Network (MBSFN) areas C 438 that the wireless communication device 104 is currently receiving via the serving cell 102 minus the number of Multimedia Broadcast over a Single Frequency Network (MBSFN) areas D 440 that the neighbor cell 106 provides). Using Multimedia Broadcast over a Single Frequency Network (MBSFN) areas 216 to determine rank may reduce the processing delay (as compared to using the number of lost Temporary Mobile Group Identities (TMGIs)) because the wireless communication device 104 only needs to acquire the SIB13 (the number of lost Temporary Mobile Group Identities (TMGIs) requires that the wireless communication device 104 acquire all Multicast Control Channels (MCCHs) 322).

The ranking module 442 may also include a second penalty function P' 450 that bases rank on the lost Multimedia Broadcast over a Single Frequency Network (MBSFN) areas 216. The second penalty function P' 450 may be a function of the number of lost Multimedia Broadcast over a Single Frequency Network (MBSFN) areas 216 if a neighbor cell 106 is to be reselected (and may thus reduce the neighbor cell rank R_n 432). The second penalty function P' 450 may be a non-decreasing function of the input, with P'(0)=0. The second penalty function P' 450 may depend on the serving cell number of Multimedia Broadcast over a Single Frequency Network (MBSFN) areas C 438 and the neighbor cell number of Multimedia Broadcast over a Single Frequency Network (MBSFN) areas D 440. For example, the neighbor cell rank R_n 432 may be computed using Equation (4) instead of Equation (2):

$$R\_n = Q\_n - Q\_\text{offset} - P'(C-D). \quad (4)$$

In some configurations where ranking is performed, the wireless communication device 104 may have not started to receive an evolved Multicast Broadcast Multimedia Service (eMBMS) service. For example, the wireless communication device 104 may be interested in receiving an evolved Multicast Broadcast Multimedia Service (eMBMS) service. When the wireless communication device 104 has not started to receive an evolved Multicast Broadcast Multimedia Service (eMBMS) service, the rank may be computed using a gain function. The more Temporary Mobile Group Identities (TMGIs) or Multimedia Broadcast over a Single Frequency Network (MBSFN) areas 216 that a cell has, the more likely the cell can carry the channel that the user of the wireless communication device 104 is interested in.

The ranking module 442 may include a first gain function G 452. The first gain function G 452 may be a function of the number of active Temporary Mobile Group Identities (TMGIs) of the serving cell 102 (i.e., the serving cell number of Temporary Mobile Group Identities (TMGIs) A 434). The first gain function G 452 may be a non-decreasing function of the input, with G(0) substantially lower than the positive input. As an example, the serving cell rank R_s 430 may be computed using Equation (5) instead of Equation (1):

$$R\_s = Q\_s + Q\_\text{hys} + G(A). \quad (5)$$

The ranking module 442 may also include a second gain function G' 454. The second gain function G' 454 may be a function of the number of active Temporary Mobile Group Identities (TMGIs) of the neighbor cell 106 (i.e., the neighbor cell number of Temporary Mobile Group Identities (TMGIs) B 436). The second gain function G' 454 may be a non-decreasing function of the input, with G'(0) substantially lower than the positive input. As an example, the neighbor cell rank R_n 432 may be computed using Equation (6) instead of Equation (2):

$$R\_n = Q\_n - Q\_\text{offset} + G'(B). \quad (6)$$

The ranking module 442 may further include a third gain function G" 456. The third gain function G" 456 may be a function of the number of Multimedia Broadcast over a Single Frequency Network (MBSFN) areas 216 of the serving cell 102 (i.e., the serving cell number of Multimedia Broadcast over a Single Frequency Network (MBSFN) areas C 438). The third gain function G" 456 may be a non-decreasing function of the input, with G"(0) substantially lower than the positive input. As an example, the serving cell rank R_s 430 may be computed using Equation (7) instead of Equation (1):

$$R\_s = Q\_s + Q\_\text{hys} + G''(C). \quad (7)$$

The ranking module 442 may also include a fourth gain function G''' 458. The fourth gain function G''' 458 may be a function of the number of Multimedia Broadcast over a Single Frequency Network (MBSFN) areas 216 of the neighbor cell 106 (i.e., the neighbor cell number of Multimedia Broadcast over a Single Frequency Network (MBSFN) areas D 440). The fourth gain function G''' 458 may be a non-decreasing function of the input, with G'''(0) substantially lower than the positive input. As an example, the neighbor cell rank R_n 432 may be computed using Equation (8) instead of Equation (2):

$$R\_n = Q\_n - Q\_\text{offset} + G'''(D). \quad (8)$$

Thus, the ranking module 442 may compute an updated serving cell rank R_s 430 for the serving cell 102 and an updated neighbor cell rank R_n 432 for each discovered neighbor cell 106 when the wireless communication device 104 is in RRC_IDLE state. Either the first penalty function P 448 or the second penalty function P' 450 may be used to compute the neighbor cell rank R_n 432 when the wireless communication device 104 is already receiving one or more evolved Multicast Broadcast Multimedia Service (eMBMS) services. Either the first gain function G 452 may be used for computing the serving cell rank R_s 430 and the second gain function G' 454 may be used for computing the neighbor cell rank R_n 432 or the third gain function G" 456 may be used for computing the serving cell rank R_s 430 and the fourth gain function G''' 458 may be used for computing the neighbor cell rank R_n 432 when the wireless communication device 104 has not started to receive an evolved Multicast Broadcast Multimedia Service (eMBMS) service but is interested in receiving evolved Multicast Broadcast Multimedia Service (eMBMS) service. A wireless communication device 104 may become interested in receiving evolved Multicast Broadcast Multimedia Service (eMBMS) service, for example, when an evolved Multicast Broadcast Multimedia Service (eMBMS) application of the wireless communication device 104 is being launched and the evolved Multicast Broadcast Multimedia Service (eMBMS) application is related to some evolved Multicast Broadcast Multimedia Service (eMBMS) services that the wireless communication device 104 has not started to receive yet. As another example, a wireless communication device 104 may be interested in receiving evolved Multicast Broadcast Multimedia Service (eMBMS) service that the wireless communication device 104 is already receiving.

Figure 5:
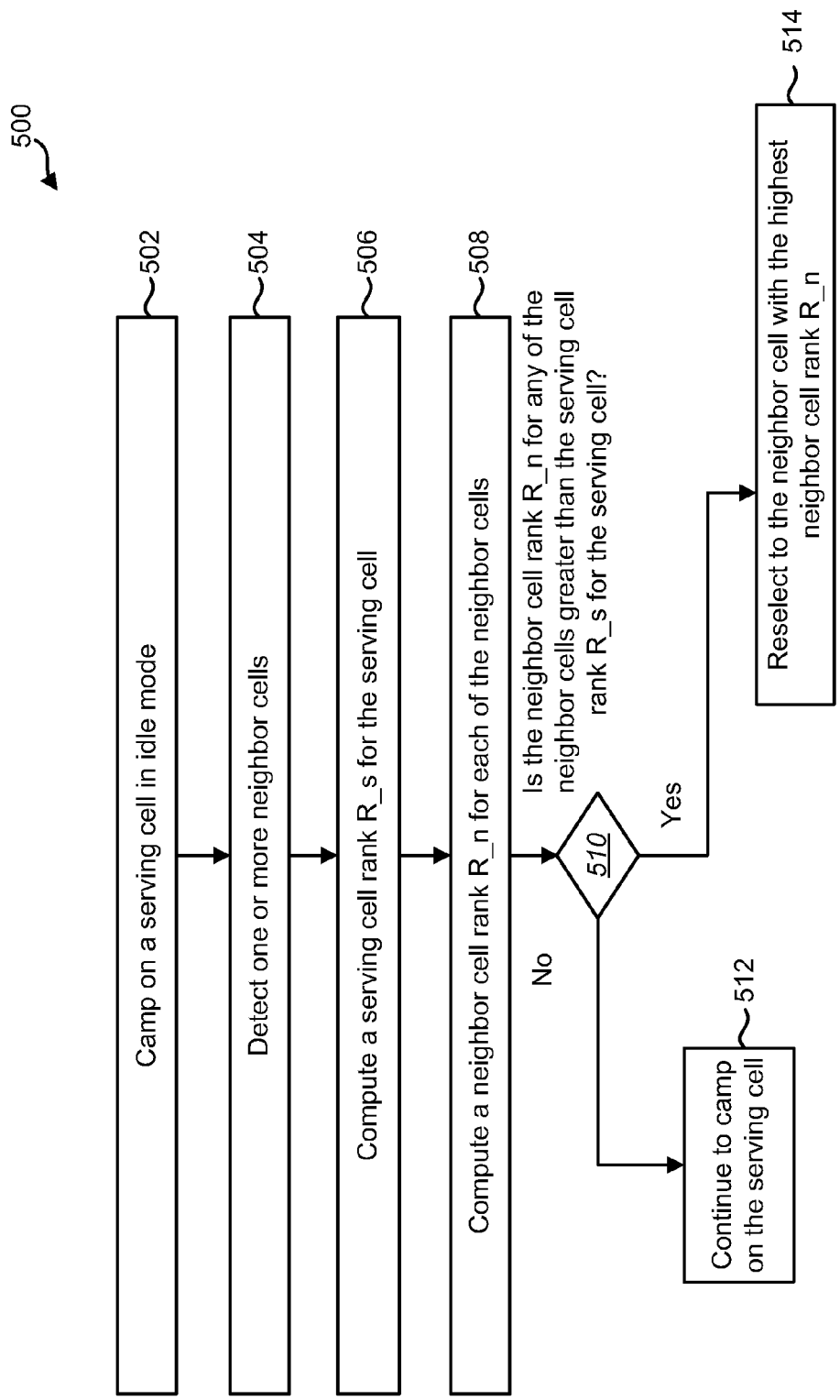
FIG. 5 is a flow diagram of a method for cell reselection based on a Multimedia Broadcast Multicast Service (MBMS) metric.

FIG. 5 is a flow diagram of a method 500 for cell reselection based on a Multimedia Broadcast Multicast Service (MBMS) metric. The method 500 may be performed by a wireless communication device 104. The wireless communication device 104 may camp 502 on a serving cell 102 in idle mode. The wireless communication device 104 may detect 504 one or more neighbor cells 106. The wireless communication device 104 may compute 506 a serving cell rank R_s 430 for the serving cell 102. For example, the wireless communication device 104 may compute 506 the serving cell rank R_s 430 for the serving cell 102 using Equation (1), Equation (5) or Equation (7) above.

The wireless communication device 104 may compute 508 a neighbor cell rank R_n 432 for each of the neighbor cells 106. For example, the wireless communication device 104 may compute 508 the neighbor cell rank R_n 432 for each neighbor cell 106 using Equation (3), Equation (4), Equation (6) or Equation (8) above.

The wireless communication device 104 may determine 510 whether the neighbor cell rank R_n 432 of any of the neighbor cells 106 is greater than the serving cell rank R_s 430. If the serving cell rank R_s 430 is greater than the neighbor cell rank R_n 432 of any of the neighbor cells 106, the wireless communication device 104 may continue 512 to camp on the serving cell 102. If the neighbor cell rank R_n 432 of any of the neighbor cells 106 is greater than the serving cell rank R_s 430, the wireless communication device 104 may reselect 514 to the neighbor cell 106 with the highest neighbor cell rank R_n 432.

Figure 6:
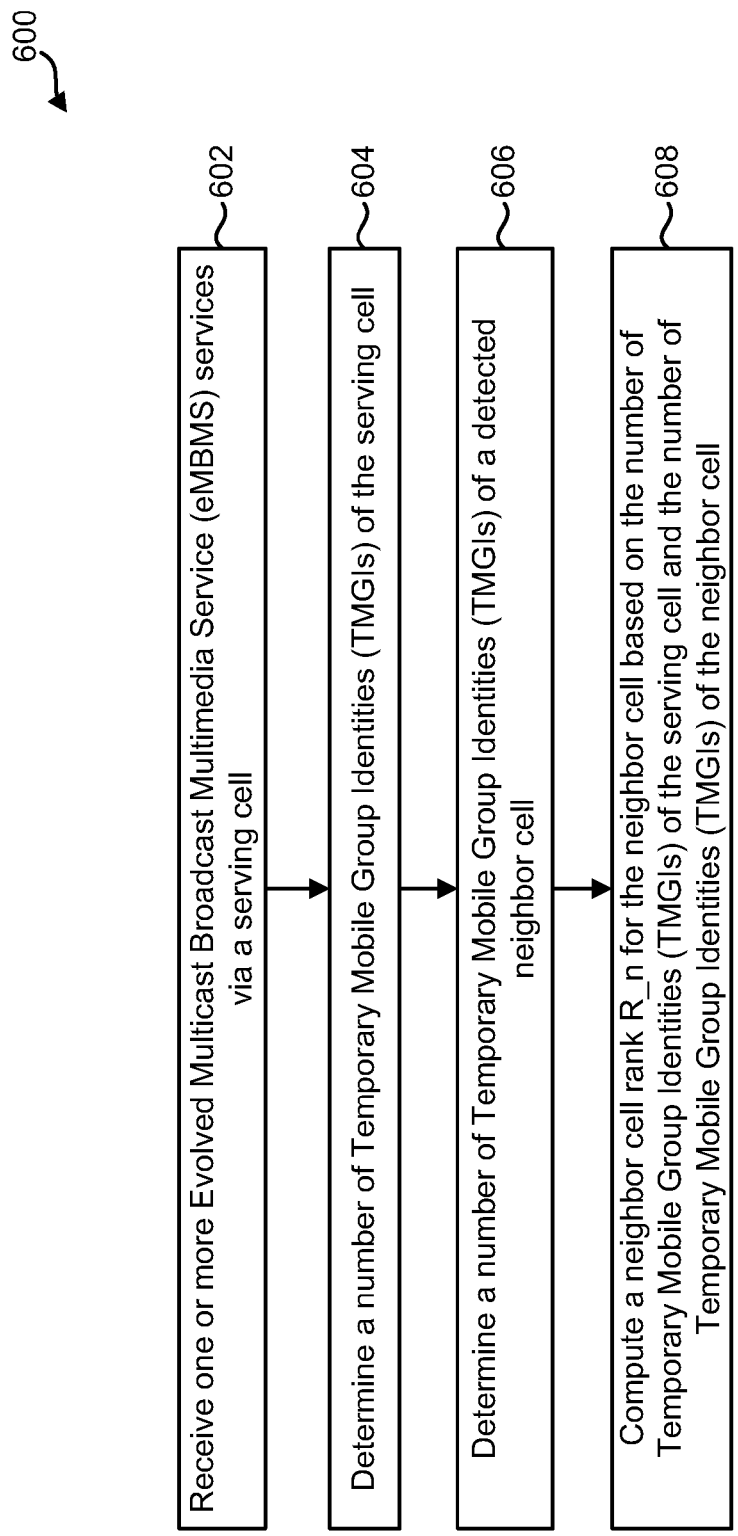
FIG. 6 is a flow diagram of a method for computing a neighbor cell rank R_n based on the number of potentially lost Temporary Mobile Group Identities (TMGIs)

FIG. 6 is a flow diagram of a method 600 for computing a neighbor cell rank R_n 432 based on the number of potentially lost Temporary Mobile Group Identities (TMGIs). The method 600 may be performed by a wireless communication device 104. The method 600 may correspond to computing 508 a neighbor cell rank R_n 432 for each of the neighbor cells 106. The wireless communication device 104 may receive 602 one or more evolved Multicast Broadcast Multimedia Service (eMBMS) services via a serving cell 102.

The wireless communication device 104 may determine 604 a number of Temporary Mobile Group Identities (TMGIs) of the serving cell 102 (i.e., the serving cell number of Temporary Mobile Group Identities (TMGIs) A 434). The wireless communication device 104 may also determine 606 a number of Temporary Mobile Group Identities (TMGIs) of a detected neighbor cell 106 (i.e., the neighbor cell number of Temporary Mobile Group Identities (TMGIs) B 436). The wireless communication device 104 may compute 608 a neighbor cell rank R_n 432 for the neighbor cell 106 based on the serving cell number of Temporary Mobile Group Identities (TMGIs) A 434 and the neighbor cell number of Temporary Mobile Group Identities (TMGIs) B 436. For example, the wireless communication device 104 may use Equation (3) above to compute the neighbor cell rank R_n 432.

Figure 7:
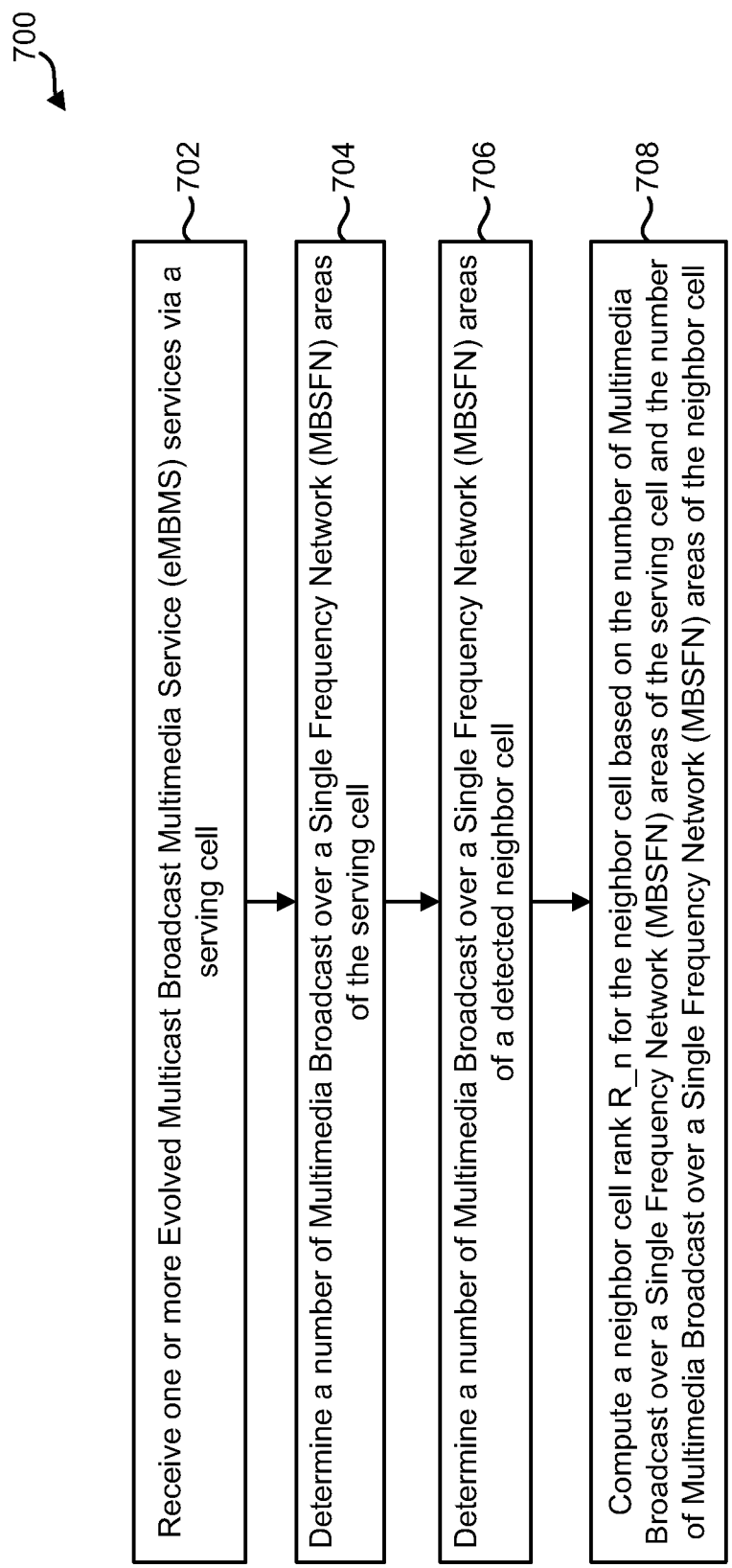
FIG. 7 is a flow diagram of a method for computing a neighbor cell rank R_n based on the number of potentially lost Multimedia Broadcast over a Single Frequency Network (MBSFN) areas.

FIG. 7 is a flow diagram of a method 700 for computing a neighbor cell rank R_n 432 based on the number of potentially lost Multimedia Broadcast over a Single Frequency Network (MBSFN) areas 216. The method 700 may be performed by a wireless communication device 104. The method 700 may correspond to computing 508 a neighbor cell rank R_n 432 for each of the neighbor cells 106. The wireless communication device 104 may receive 702 one or more evolved Multicast Broadcast Multimedia Service (eMBMS) services via a serving cell 102.

The wireless communication device 104 may determine 704 a number of Multimedia Broadcast over a Single Frequency Network (MBSFN) areas 216 of the serving cell 102 (i.e., the serving cell number of Multimedia Broadcast over a Single Frequency Network (MBSFN) areas C 438). The wireless communication device 104 may also determine 706 a number of Multimedia Broadcast over a Single Frequency Network (MBSFN) areas 216 of a detected neighbor cell 106 (i.e., the neighbor cell number of Multimedia Broadcast over a Single Frequency Network (MBSFN) areas D 440). The wireless communication device 104 may compute 708 a neighbor cell rank R_n 432 for the neighbor cell 106 based on the serving cell number of Multimedia Broadcast over a Single Frequency Network (MBSFN) areas C 438 and the neighbor cell number of Multimedia Broadcast over a Single Frequency Network (MBSFN) areas D 440. For example, the wireless communication device 104 may use Equation (4) above to compute 708 the neighbor cell rank R_n 432.

Figure 8:
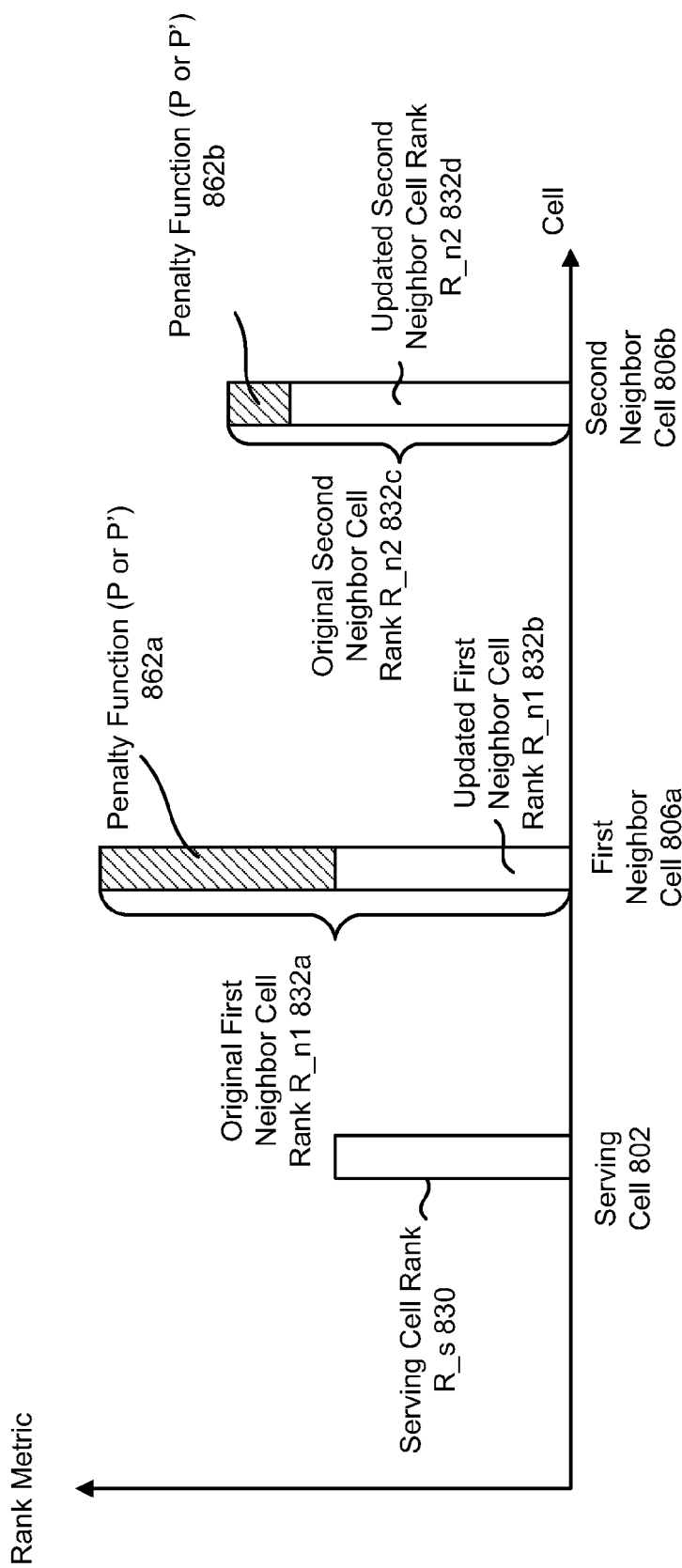
FIG. 8 is a diagram illustrating one example of cell reselection determination where the wireless communication device is receiving one or more evolved Multicast Broadcast Multimedia Service (eMBMS) services.

FIG. 8 is a diagram illustrating one example of cell reselection determination where the wireless communication device 104 is receiving one or more evolved Multicast Broadcast Multimedia Service (eMBMS) services. The rank metrics for a serving cell 802, a first neighbor cell 806a and a second neighbor cell 806b are each shown. The serving cell rank R_s 830 is shown (as computed using Equation (1) above).

The original first neighbor cell rank R_n1 832a is also shown (as computed using Equation (2) above). The penalty function (P or P') 862a represents the penalty to the original first neighbor cell rank R_n1 832a due to either the number of lost Temporary Mobile Group Identities (TMGIs) or the number of lost Multimedia Broadcast over a Single Frequency Network (MBSFN) areas 216 if the first neighbor cell 806a is to be reselected to. Thus, the updated first neighbor cell rank R_n1 832b is shown (as computed using Equation (3) or Equation (4) above) as the original first neighbor cell rank R_n1 832a minus the penalty function (P or P') 862a.

The original second neighbor cell rank R_n2 832c is shown (as computed using Equation (2) above). The penalty function (P or P') 862b represents the penalty to the original second neighbor cell rank R_n2 832c due to either the number of lost Temporary Mobile Group Identities (TMGIs) or the number of lost Multimedia Broadcast over a Single Frequency Network (MBSFN) areas 216 if the second neighbor cell 806b is to be reselected to. Thus, the updated second neighbor cell rank R_n2 832d is shown (as computed using Equation (3) or Equation (4) above) as the original second neighbor cell rank R_n2 832c minus the penalty function (P or P') 862b.

As can be seen in FIG. 8, the original first neighbor cell rank R_n1 832a is greater than the serving cell rank R_s 830 and the original second neighbor cell rank R_n2 832c. However, when the number of lost Temporary Mobile Group Identities (TMGIs) or the number of lost Multimedia Broadcast over a Single Frequency Network (MBSFN) areas 216 is taken into account, the updated second neighbor cell rank R_n2 832d is greater than the updated first neighbor cell rank R_n1 832b and the serving cell rank R_s 830. Thus, reselection to the second neighbor cell 806b may be preferred when evolved Multicast Broadcast Multimedia Service (eMBMS) services are considered.

Figure 9:
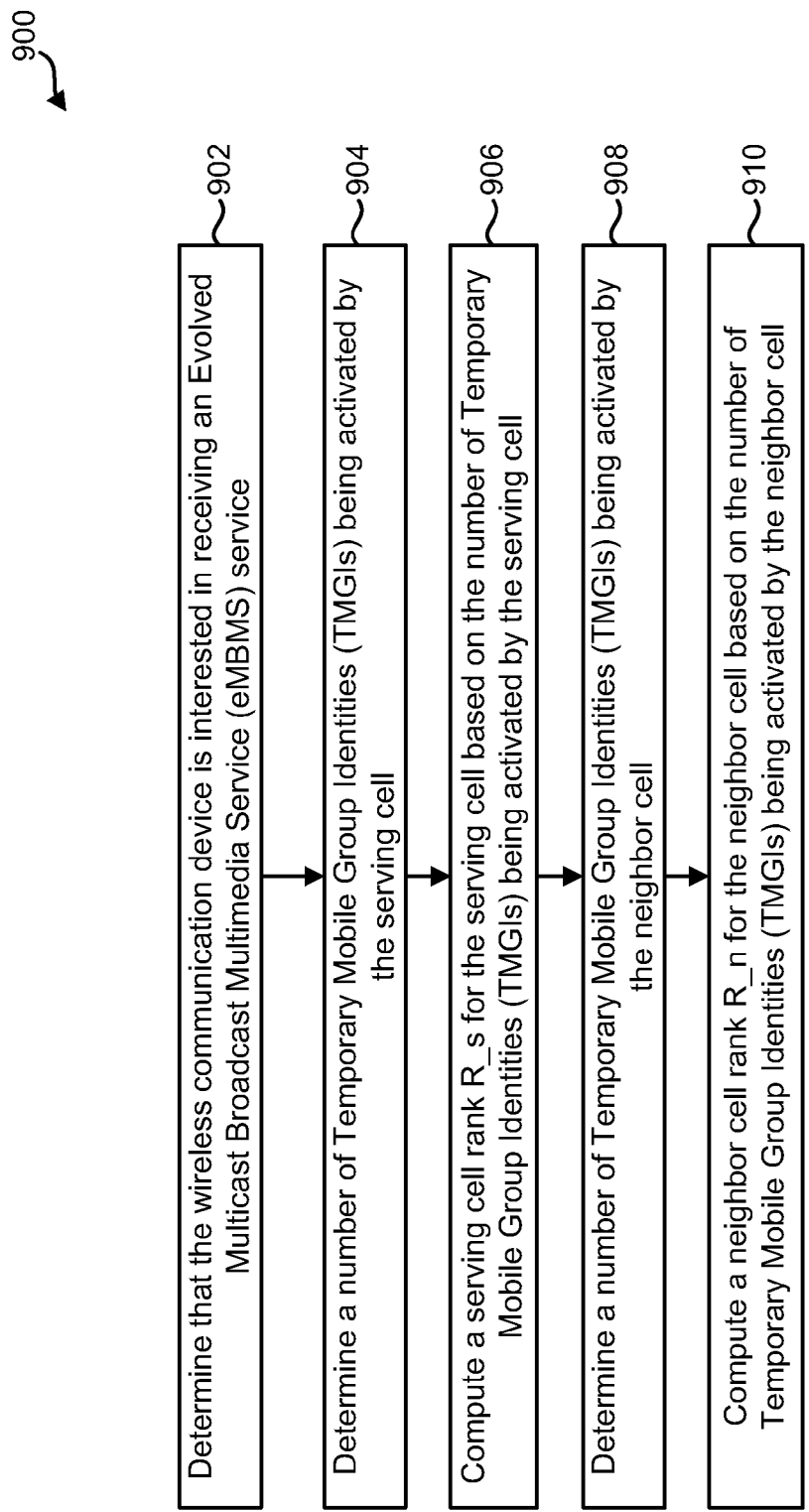
FIG. 9 is a flow diagram of a method for computing ranks based on the number of Temporary Mobile Group Identities (TMGIs) being activated by a cell.

FIG. 9 is a flow diagram of a method 900 for computing ranks based on the number of Temporary Mobile Group Identities (TMGIs) being activated by a cell. The method 900 may be performed by a wireless communication device 104. The method 900 may correspond to computing 508 a neighbor cell rank R_n 432 for each of the neighbor cells 106 and computing 506 a serving cell rank R_s 430 for the serving cell 102.

The wireless communication device 104 may determine 902 that the wireless communication device 104 is interested in receiving an evolved Multicast Broadcast Multimedia Service (eMBMS) service. The wireless communication device 104 may determine 904 a number of Temporary Mobile Group Identities (TMGIs) being activated by the serving cell 102 (i.e., the serving cell number of Temporary Mobile Group Identities (TMGIs) A 434). The wireless communication device 104 may compute 906 a serving cell rank R_s 430 for the serving cell 102 based on the number of Temporary Mobile Group Identities (TMGIs) being activated by the serving cell 102. For example, the wireless communication device 104 may compute 906 the serving cell rank R_s 430 using Equation (5) above.

The wireless communication device 104 may also determine 908 a number of Temporary Mobile Group Identities (TMGIs) being activated by a neighbor cell 106 (i.e., the neighbor cell number of Temporary Mobile Group Identities (TMGIs) B 436). The wireless communication device 104 may compute 910 a neighbor cell rank R_n 432 for the neighbor cell 106 based on the number of Temporary Mobile Group Identities (TMGIs) being activated by the neighbor cell 106. For example, the wireless communication device 104 may compute 910 the neighbor cell rank R_n 432 using Equation (6) above.

Figure 10:
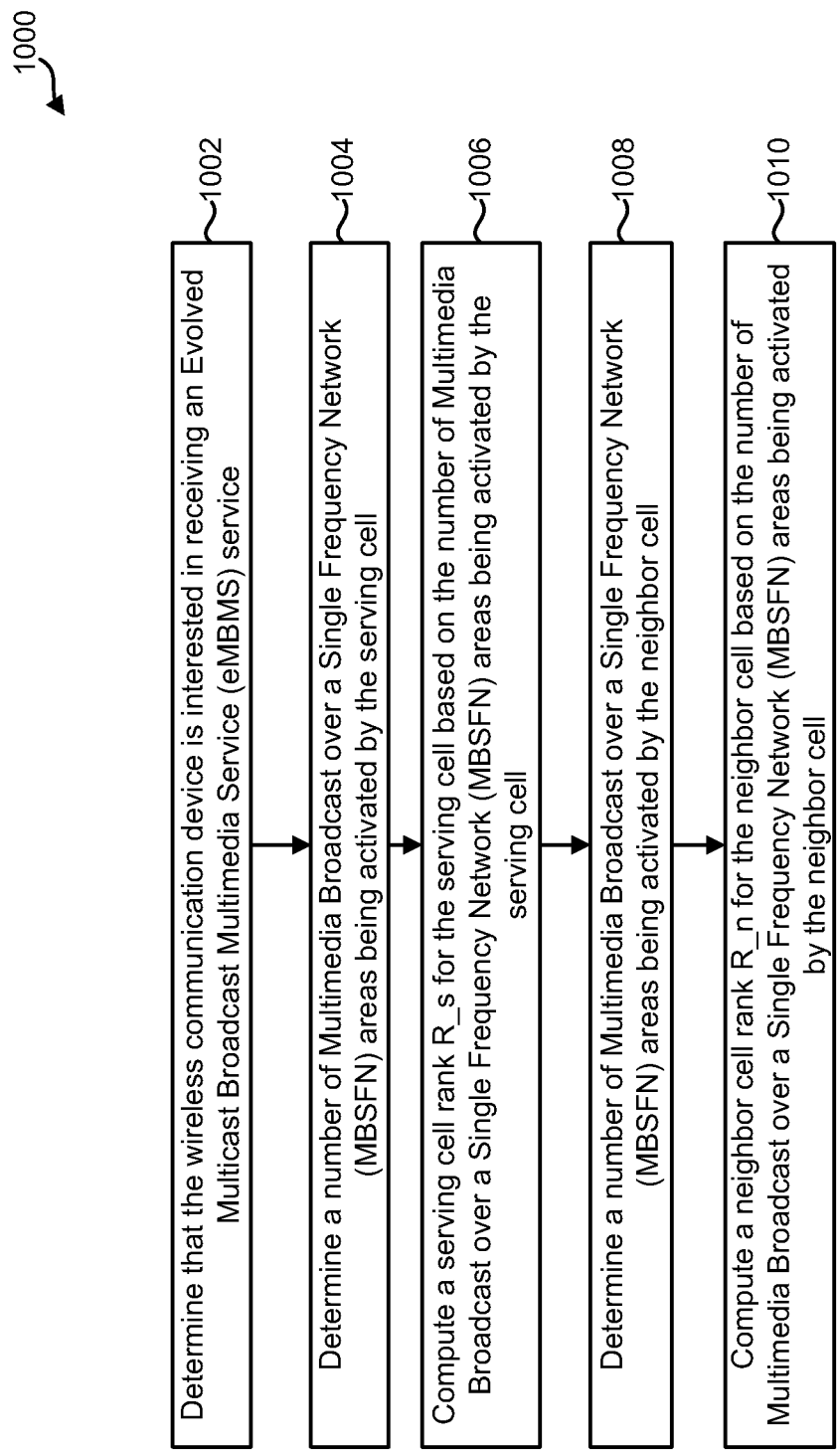
FIG. 10 is a flow diagram of a method for computing ranks based on the number of Multimedia Broadcast over a Single Frequency Network (MBSFN) areas being activated by a cell.

FIG. 10 is a flow diagram of a method 1000 for computing ranks based on the number of Multimedia Broadcast over a Single Frequency Network (MBSFN) areas 216 being activated by a cell. The method 1000 may be performed by a wireless communication device 104. The method 1000 may correspond to computing 508 a neighbor cell rank R_n 432 for each of the neighbor cells 106 and computing 506 a serving cell rank R_s 430 for the serving cell 102.

The wireless communication device 104 may determine 1002 that the wireless communication device 104 is interested in receiving an evolved Multicast Broadcast Multimedia Service (eMBMS) service. The wireless communication device 104 may determine 1004 a number of Multimedia Broadcast over a Single Frequency Network (MBSFN) areas 216 being activated by the serving cell 102 (i.e., the serving cell number of Multimedia Broadcast over a Single Frequency Network (MBSFN) areas C 438). The wireless communication device 104 may compute 1006 a serving cell rank R_s 430 for the serving cell 102 based on the number of Multimedia Broadcast over a Single Frequency Network (MBSFN) areas 216 being activated by the serving cell 102. For example, the wireless communication device 104 may compute 1006 the serving cell rank R_s 430 using Equation (7) above.

The wireless communication device 104 may also determine 1008 a number of Multimedia Broadcast over a Single Frequency Network (MBSFN) areas 216 being activated by a neighbor cell 106 (i.e., the neighbor cell number of Multimedia Broadcast over a Single Frequency Network (MBSFN) areas D 440). The wireless communication device 104 may compute 1010 a neighbor cell rank R_n 432 for the neighbor cell 106 based on the number of Multimedia Broadcast over a Single Frequency Network (MBSFN) areas 216 being activated by the neighbor cell 106. For example, the wireless communication device 104 may compute 1010 the neighbor cell rank R_n 432 using Equation (8) above.

Figure 11:
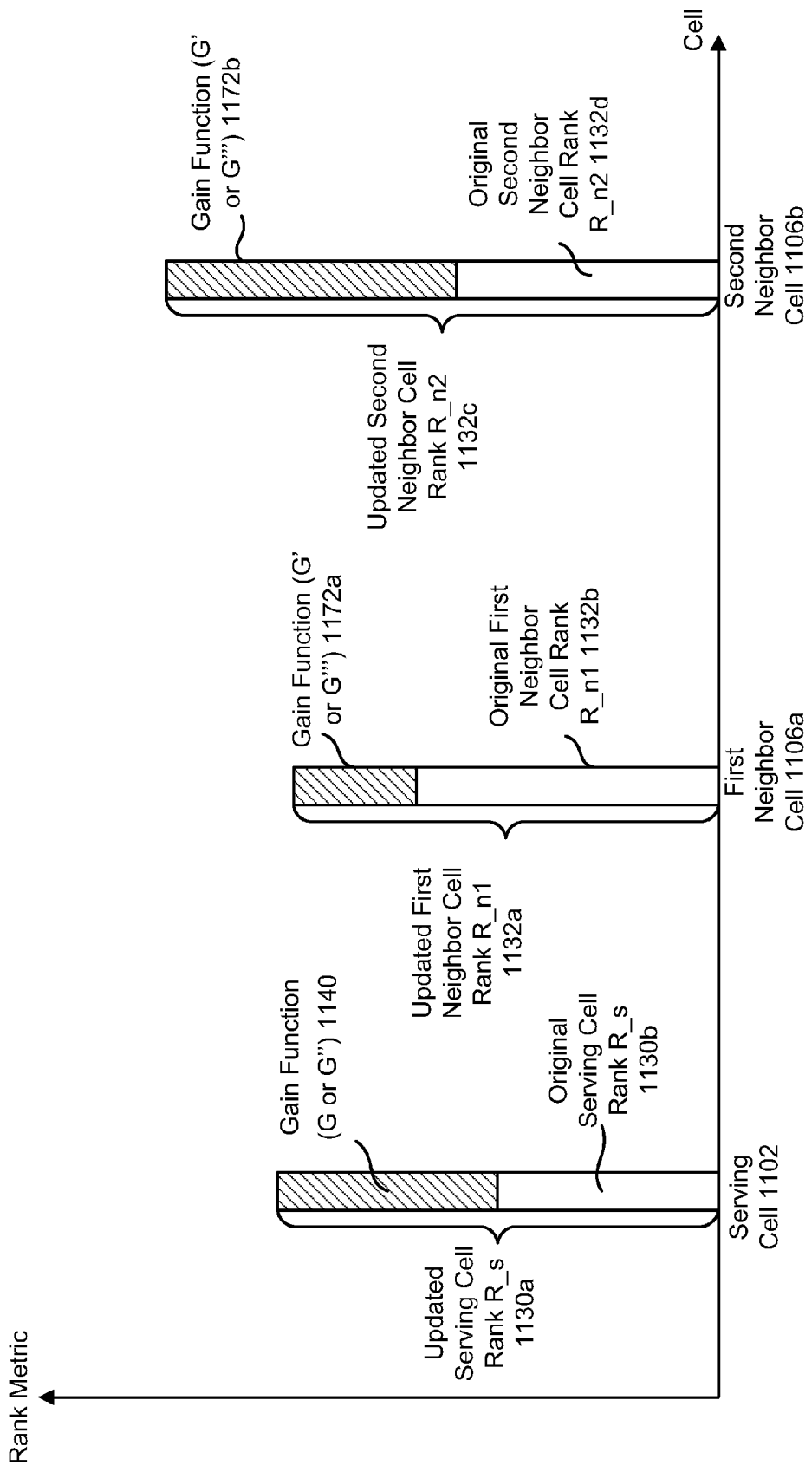
FIG. 11 is a diagram illustrating an example of cell reselection determination where the wireless communication device is not yet receiving any evolved Multicast Broadcast Multimedia Service (eMBMS) services.

FIG. 11 is a diagram illustrating an example of cell reselection determination where the wireless communication device 104 is not yet receiving any evolved Multicast Broadcast Multimedia Service (eMBMS) services. The rank metrics for a serving cell 1102, a first neighbor cell 1106a and a second neighbor cell 1106b are each shown. The original serving cell rank R_s 1130b computed according to Equation (1) above is shown. The serving cell gain function (G or G") 1140 represents the gain to the serving cell rank R_s 1130 due to either the serving cell number of Temporary Mobile Group Identities (TMGIs) C 434 or the serving cell number of Multimedia Broadcast over a Single Frequency Network (MBSFN) areas C 438. The original serving cell rank R_s 1130b and the serving cell gain function (G or G") 1140 together form the updated serving cell rank R_s 1130a (as computed according to Equation (5) or Equation (7) above).

The original first neighbor cell rank R_n1 1132b is also shown (as computed using Equation (2) above). The first neighbor cell gain function (G' or G'") 1172a represents the gain to the original first neighbor cell rank R_n1 1132b due to either the first neighbor cell number of Temporary Mobile Group Identities (TMGIs) 436 or the first neighbor cell number of Multimedia Broadcast over a Single Frequency Network (MBSFN) areas D 440. The original first neighbor cell rank R_n1 1132b and the first neighbor cell gain function (G' or G'") 1172a together form the updated first neighbor cell rank R_n1 1132a (as computed using Equation (6) or Equation (8) above).

The original second neighbor cell rank R_n2 1132d is shown (as computed using Equation (2) above). The second neighbor cell gain function (G' or G'") 1172b represents the gain to the original second neighbor cell rank R_n2 1132d due to either the second neighbor cell number of Temporary Mobile Group Identities (TMGIs) 436 or the second neighbor cell number of Multimedia Broadcast over a Single Frequency Network (MBSFN) areas D 440. The original second neighbor cell rank R_n1 1132d and the second neighbor cell gain function (G' or G'") 1172b together form the updated second neighbor cell rank R_n2 1132c (as computed using Equation (6) or Equation (8) above).

As can be seen in FIG. 11, the original first neighbor cell rank R_n1 1132b is greater than the original serving cell rank R_s 1130b and the original second neighbor cell rank R_n2 1132d. However, when the number of Temporary Mobile Group Identities (TMGIs) or the number of Multimedia Broadcast over a Single Frequency Network (MBSFN) areas 216 is taken into account, the updated second neighbor cell rank R_n2 1132c is greater than the updated first neighbor cell rank R_n1 1132a and the updated serving cell rank R_s 1130a. Thus, reselection to the second neighbor cell 1106b may be preferred when evolved Multicast Broadcast Multimedia Service (eMBMS) services are considered.

Figure 12:
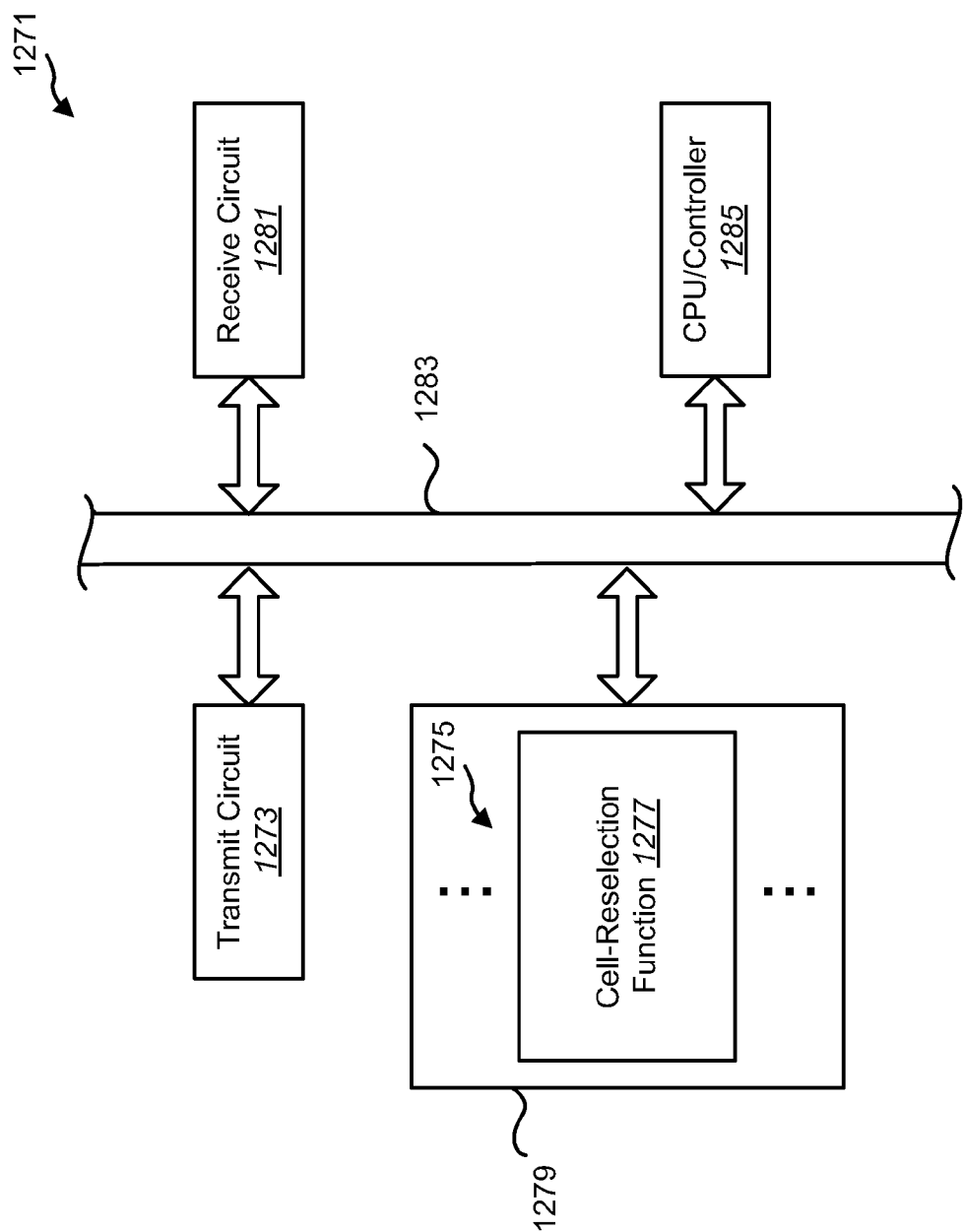
FIG. 12 illustrates certain components that may be included within a wireless communication device.

FIG. 12 shows part of a hardware implementation of a wireless communication device 1271 for executing the schemes or processes as described above. The wireless communication device 1271 comprises circuitry as described below. In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, units, blocks and the like, such as shown and described in FIG. 12.

The wireless communication device 1271 includes a central data bus 1283 linking several circuits together. The circuits include a CPU (Central Processing Unit) or a controller 1285, a receive circuit 1281, a transmit circuit 1273, and a memory unit 1279.

The receive circuit 1281 and the transmit circuit 1273 can be connected to an RF (Radio Frequency) circuit (which is not shown in the drawing). The receive circuit 1281 processes and buffers received signals before sending the signals out to the data bus 1283. On the other hand, the transmit circuit 1273 processes and buffers the data from the data bus 1283 before sending the data out of the wireless communication device 1271. The CPU/controller 1285 performs the function of data management of the data bus 1283 and furthers the function of general data processing, including executing the instructional contents of the memory unit 1279.

The memory unit 1279 includes a set of modules and/or instructions generally signified by the reference numeral 1275. In this embodiment, the modules/instructions include, among other things, a cell-reselection function 1277, which carries out the schemes and processes as described above. The function 1277 includes computer instructions or code for executing the process steps as shown and described in FIGS. 5-7 and 9-10. Specific instructions particular to an entity can be selectively implemented in the function 1277.

In this embodiment, the memory unit 1279 is a RAM (Random Access Memory) circuit. The exemplary functions, such as the function 1277, include one or more software routines, modules and/or data sets. The memory unit 1279 can be tied to another memory circuit (not shown), which can be either volatile or nonvolatile. As an alternative, the memory unit 1279 can be made of other circuit types, such as an EEPROM (Electrically Erasable Programmable Read-Only Memory), an EPROM (Electrical Programmable Read-Only Memory), a ROM (Read-Only Memory), an ASIC (Application Specific Integrated Circuit), a magnetic disk, an optical disk, and others well known in the art.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

No claim element is to be construed under the provisions of 35 U.S.C. §112, sixth paragraph, unless the element is expressly recited using the phrase "means for" or, in the case of a method claim, the element is recited using the phrase "step for."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 5-7 and FIGS. 9-10, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A wireless communication device, comprising:
   means for camping on a serving cell in idle mode;
   means for detecting a neighbor cell;
   means for determining that the wireless communication device is interested in receiving evolved multicast broadcast multimedia service;
   means for computing a serving cell rank for the serving cell, wherein the means for computing the serving cell rank comprises:
      means for determining a number of temporary mobile group identities being activated by the serving cell, and
      means for computing the serving cell rank based on the number of temporary mobile group identities being activated by the serving cell;
   means for computing a neighbor cell rank for the neighbor cell, wherein the means for computing the neighbor cell rank comprises:
      means for determining a number of temporary mobile group identities being activated by the neighbor cell, and
      means for computing the neighbor cell rank based on the number of temporary mobile group identities being activated by the neighbor cell; and
   means for determining cell reselection based on the serving cell rank and the neighbor cell rank.

2. The wireless communication device of claim 1, further comprising means for reselecting to the neighbor cell if the neighbor cell rank is greater than the serving cell rank.

3. The wireless communication device of claim 1, further comprising means for continuing to camp on the serving cell if the serving cell rank is greater than the neighbor cell rank.

4. The wireless communication device of claim 1, wherein the means for computing the neighbor cell rank further comprises:
   means for receiving one or more evolved multicast broadcast multimedia service services via the serving cell;
   means for determining a number of multimedia broadcast over a single frequency network areas of the serving cell;
   means for determining a number of multimedia broadcast over a single frequency network areas of the neighbor cell; and
   wherein computing the neighbor cell rank is further based on the number of multimedia broadcast over a single frequency network areas of the serving cell and the number of multimedia broadcast over a single frequency network areas of the neighbor cell.

5. The wireless communication device of claim 4, wherein the neighbor cell rank is computed using a penalty function of a difference between the number of multimedia broadcast over a single frequency network areas of the serving cell and the number of multimedia broadcast over a single frequency network areas of the neighbor cell.

6. The wireless communication device of claim 5, wherein the neighbor cell rank is a neighbor cell signal minus an offset value minus the penalty function.

7. The wireless communication device of claim 1, wherein the serving cell rank is computed using a gain function of the number of temporary mobile group identities being activated by the serving cell.

8. The wireless communication device of claim 7, wherein the serving cell rank is a serving cell signal plus a hysteresis value plus the gain function.

9. The wireless communication device of claim 1, wherein the neighbor cell rank is computed using a gain function of the number of temporary mobile group identities being activated by the neighbor cell.

10. The wireless communication device of claim 9, wherein the neighbor cell rank is a neighbor cell signal minus an offset value plus the gain function.

11. The wireless communication device of claim 1, wherein the means for computing the serving cell rank comprises:
   means for determining a number of multimedia broadcast over a single frequency network areas being activated by the serving cell, and
   means for computing the serving cell rank based on the number of multimedia broadcast over a single frequency network areas being activated by the serving cell; and
   wherein the means for computing the neighbor cell rank further comprises:
   means for determining a number of multimedia broadcast over a single frequency network areas being activated by the neighbor cell, and
   wherein computing the neighbor cell rank is further based on the number of multimedia broadcast over a single frequency network areas being activated by the neighbor cell.

12. The wireless communication device of claim 11, wherein the serving cell rank is computed using a gain function of the number of multimedia broadcast over a single frequency network areas being activated by the serving cell.

13. The wireless communication device of claim 11, wherein the neighbor cell rank is computed using a gain function of the number of multimedia broadcast over a single frequency network areas being activated by the neighbor cell.

14. A wireless communication device, comprising:
   means for camping on a serving cell in idle mode;
   means for detecting a neighbor cell;
   means for computing a serving cell rank for the serving cell;
   means for computing a neighbor cell rank for the neighbor cell, wherein the means for computing the neighbor cell rank comprises:
     means for receiving one or more evolved multicast broadcast multimedia service services via the serving cell,
     means for determining a number of temporary mobile group identities of the serving cell,
     means for determining a number of temporary mobile group identities of the neighbor cell, and
     means for computing the neighbor cell rank based on the number of temporary mobile group identities of the serving cell and the number of temporary mobile group identities of the neighbor cell; and
   means for determining cell reselection based on the serving cell rank and the neighbor cell rank.

15. The wireless communication device of claim 14, wherein the neighbor cell rank is computed using a penalty function of a difference between the number of temporary mobile group identities of the serving cell and the number of temporary mobile group identities of the neighbor cell.

16. The wireless communication device of claim 15, wherein the neighbor cell rank is a neighbor cell signal minus an offset value minus the penalty function.

17. An apparatus, comprising:
   circuitry configured:
   to camp on a serving cell in idle mode,
   to detect a neighbor cell,
   to determine that the apparatus is interested in receiving evolved multicast broadcast multimedia service,
   to compute a serving cell rank for the serving cell, wherein the circuitry configured to compute the serving cell rank comprises circuitry configured:
     to determine a number of temporary mobile group identities being activated by the serving cell, and
     to compute the serving cell rank based on the number of temporary mobile group identities being activated by the serving cell,
   to compute a neighbor cell rank for the neighbor cell, wherein the circuitry configured to computer the neighbor cell rank comprises circuitry configured:
     to determine a number of temporary mobile group identities being activated by the neighbor cell, and
     to compute the neighbor cell rank based on the number of temporary mobile group identities being activated by the neighbor cell, and
   to determine cell reselection based on the serving cell rank and the neighbor cell rank.

18. The apparatus of claim 17, further comprising circuitry configured to reselect to the neighbor cell if the neighbor cell rank is greater than the serving cell rank.

19. The apparatus of claim 17, further comprising circuitry configured to continue to camp on the serving cell if the serving cell rank is greater than the neighbor cell rank.

20. The apparatus of claim 17, wherein the circuitry configured to compute the neighbor cell rank further comprises:
   circuitry configured to receive one or more evolved multicast broadcast multimedia service services via the serving cell, to determine a number of multimedia broadcast over a single frequency network areas of the serving cell, to determine a number of multimedia broadcast over a single frequency network areas of the neighbor cell, and wherein computing the neighbor cell rank is further based on the number of multimedia broadcast over a single frequency network areas of the serving cell and the number of multimedia broadcast over a single frequency network areas of the neighbor cell.

21. The apparatus of claim 20, wherein the neighbor cell rank is computed using a penalty function of a difference between the number of multimedia broadcast over a single frequency network areas of the serving cell and the number of multimedia broadcast over a single frequency network areas of the neighbor cell.

22. The apparatus of claim 21, wherein the neighbor cell rank is a neighbor cell signal minus an offset value minus the penalty function.

23. The apparatus of claim 17, wherein the serving cell rank is computed using a gain function of the number of temporary mobile group identities being activated by the serving cell.

24. The apparatus of claim 23, wherein the serving cell rank is a serving cell signal plus a hysteresis value plus the gain function.

25. The apparatus of claim 17, wherein the neighbor cell rank is computed using a gain function of the number of temporary mobile group identities being activated by the neighbor cell.

26. The apparatus of claim 25, wherein the neighbor cell rank is a neighbor cell signal minus an offset value plus the gain function.

27. The apparatus of claim 17, wherein the circuitry configured to compute the serving cell rank comprises:
circuitry configured to determine a number of multimedia broadcast over a single frequency network areas being activated by the serving cell, and to compute the serving cell rank based on the number of multimedia broadcast over a single frequency network areas being activated by the serving cell,
wherein the circuitry configured to compute the neighbor cell rank further comprises:
circuitry configured to determine a number of multimedia broadcast over a single frequency network areas being activated by the neighbor cell, and wherein computing the neighbor cell rank is further based on the number of multimedia broadcast over a single frequency network areas being activated by the neighbor cell.

28. The apparatus of claim 27, wherein the serving cell rank is computed using a gain function of the number of multimedia broadcast over a single frequency network areas being activated by the serving cell.

29. The apparatus of claim 27, wherein the neighbor cell rank is computed using a gain function of the number of multimedia broadcast over a single frequency network areas being activated by the neighbor cell.

30. An apparatus, comprising:
circuitry configured:
to camp on a serving cell in idle mode,
to detect a neighbor cell,
to compute a serving cell rank for the serving cell;
to compute a neighbor cell rank for the neighbor cell, wherein the circuitry configured to compute the neighbor cell rank comprises circuitry configured:
to receive one or more evolved multicast broadcast multimedia service services via the serving cell,
to determine a number of temporary mobile group identities of the serving cell,
to determine a number of temporary mobile group identities of the neighbor cell, and
to compute the neighbor cell rank based on the number of temporary mobile group identities of the serving cell and the number of temporary mobile group identities of the neighbor cell, and
to determine cell reselection based on the serving cell rank and the neighbor cell rank.

31. The apparatus of claim 30, wherein the neighbor cell rank is computed using a penalty function of a difference between the number of temporary mobile group identities of the serving cell and the number of temporary mobile group identities of the neighbor cell.

32. The apparatus of claim 31, wherein the neighbor cell rank is a neighbor cell signal minus an offset value minus the penalty function.

33. A method operable by a wireless communication device, comprising:
camping on a serving cell in idle mode;
detecting a neighbor cell;
determining that the wireless communication device is interested in receiving evolved multicast broadcast multimedia service;
computing a serving cell rank for the serving cell, wherein computing the serving cell rank comprises:
determining a number of temporary mobile group identities being activated by the serving cell, and
computing the serving cell rank based on the number of temporary mobile group identities being activated by the serving cell;
computing a neighbor cell rank for the neighbor cell, wherein the computing the neighbor cell rank comprises:
determining a number of temporary mobile group identities being activated by the neighbor cell, and
computing the neighbor cell rank based on the number of temporary mobile group identities being activated by the neighbor cell; and
determining cell reselection based on the serving cell rank and the neighbor cell rank.

34. The method of claim 33, further comprising reselecting to the neighbor cell if the neighbor cell rank is greater than the serving cell rank.

35. The method of claim 33, further comprising continuing to camp on the serving cell if the serving cell rank is greater than the neighbor cell rank.

36. The method of claim 33, wherein computing the neighbor cell rank further comprises:
receiving one or more evolved multicast broadcast multimedia service services via the serving cell;
determining a number of multimedia broadcast over a single frequency network areas of the serving cell;
determining a number of multimedia broadcast over a single frequency network areas of the neighbor cell; and
wherein computing the neighbor cell rank is further based on the number of multimedia broadcast over a single frequency network areas of the serving cell and the number of multimedia broadcast over a single frequency network areas of the neighbor cell.

37. The method of claim 36, wherein the neighbor cell rank is computed using a penalty function of a difference between the number of multimedia broadcast over a single frequency network areas of the serving cell and the number of multimedia broadcast over a single frequency network areas of the neighbor cell.

38. The method of claim 37, wherein the neighbor cell rank is a neighbor cell signal minus an offset value minus the penalty function.

39. The method of claim 33, wherein the serving cell rank is computed using a gain function of the number of temporary mobile group identities being activated by the serving cell.

40. The method of claim 39, wherein the serving cell rank is a serving cell signal plus a hysteresis value plus the gain function.

41. The method of claim 33, wherein the neighbor cell rank is computed using a gain function of the number of temporary mobile group identities being activated by the neighbor cell.

42. The method of claim 41, wherein the neighbor cell rank is a neighbor cell signal minus an offset value plus the gain function.

43. The method of claim 33, wherein computing the serving cell rank comprises:
determining a number of multimedia broadcast over a single frequency network areas being activated by the serving cell, and
computing the serving cell rank based on the number of multimedia broadcast over a single frequency network areas being activated by the serving cell; and
wherein computing the neighbor cell rank further comprises:
determining a number of multimedia broadcast over a single frequency network areas being activated by the neighbor cell, and
wherein computing the neighbor cell rank is further based on the number of multimedia broadcast over a single frequency network areas being activated by the neighbor cell.

44. The method of claim 43, wherein the serving cell rank is computed using a gain function of the number of multimedia broadcast over a single frequency network areas being activated by the serving cell.

45. The method of claim 43, wherein the neighbor cell rank is computed using a gain function of the number of multimedia broadcast over a single frequency network areas being activated by the neighbor cell.

46. A method operable by a wireless communication device, comprising:
camping on a serving cell in idle mode;
detecting a neighbor cell;
computing a serving cell rank for the serving cell;
computing a neighbor cell rank for the neighbor cell, wherein computing the neighbor cell rank comprises:
receiving one or more evolved multicast broadcast multimedia service services via the serving cell,
determining a number of temporary mobile group identities of the serving cell,
determining a number of temporary mobile group identities of the neighbor cell, and
computing the neighbor cell rank based on the number of temporary mobile group identities of the serving cell and the number of temporary mobile group identities of the neighbor cell; and
determining cell reselection based on the serving cell rank and the neighbor cell rank.

47. The method of claim 46, wherein the neighbor cell rank is computed using a penalty function of a difference between the number of temporary mobile group identities of the serving cell and the number of temporary mobile group identities of the neighbor cell.

48. The method of claim 47, wherein the neighbor cell rank is a neighbor cell signal minus an offset value minus the penalty function.

49. A non-transitory computer-readable medium having instructions thereon, the instructions comprising:
code for causing a wireless communication device to camp on a serving cell in idle mode;
code for causing the wireless communication device to detect a neighbor cell;
code for causing the wireless communication device to determine that the wireless communication device is interested in receiving evolved multicast broadcast multimedia service;
code for causing the wireless communication device to compute a serving cell rank for the serving cell, wherein the code for causing the wireless communication device to compute a serving cell rank comprises:
code for causing the wireless communication device to determine a number of temporary mobile group identities being activated by the serving cell, and
code for causing the wireless communication device to compute the serving cell rank based on the number of temporary mobile group identities being activated by the serving cell;
code for causing the wireless communication device to compute a neighbor cell rank for the neighbor cell, wherein the code for causing the wireless communication device to compute the neighbor cell rank comprises:
code for causing the wireless communication device to determine a number of temporary mobile group identities being activated by the neighbor cell, and
code for causing the wireless communication device to compute the neighbor cell rank based on the number of temporary mobile group identities being activated by the neighbor cell; and
code for causing the wireless communication device to determine reselection based on the serving cell rank and the neighbor cell rank.

50. The non-transitory computer-readable medium of claim 49, further comprising code for causing the wireless communication device to reselect to the neighbor cell if the neighbor cell rank is greater than the serving cell rank.

51. The non-transitory computer-readable medium of claim 49, further comprising code for causing the wireless communication device to continue to camp on the serving cell if the serving cell rank is greater than the neighbor cell rank.

52. A non-transitory computer-readable medium having instructions thereon, the instructions comprising:
code for causing a wireless communication device to camp on a serving cell in idle mode;
code for causing the wireless communication device to detect a neighbor cell;
code for causing the wireless communication device to compute a serving cell rank for the serving cell;
code for causing the wireless communication device to compute a neighbor cell rank for the neighbor cell, wherein the code for causing the wireless communication device to compute the neighbor cell rank comprises:
code for causing the wireless communication device to receive one or more evolved multicast broadcast multimedia service services via the serving cell,
code for causing the wireless communication device to determine a number of temporary mobile group identities of the serving cell,
code for causing the wireless communication device to determine a number of temporary mobile group identities of the neighbor cell, and
code for causing the wireless communication device to compute the neighbor cell rank based on the number of temporary mobile group identities of the serving cell and the number of temporary mobile group identities of the neighbor cell; and code for causing the wireless communication device to determine cell reselection based on the serving cell rank and the neighbor cell rank.

* * * * *